United States Patent [19]

Gupta

[11] Patent Number: 4,862,480
[45] Date of Patent: Aug. 29, 1989

[54] DIGITAL DATA SERVICE SYSTEM

[75] Inventor: Dev V. Gupta, Flemington, N.J.

[73] Assignee: Integrated Network Corporation, Bridgewater, N.J.

[21] Appl. No.: 36,293

[22] Filed: Apr. 9, 1987

[51] Int. Cl.$^4$ .......................................... H04L 27/00
[52] U.S. Cl. ..................... 375/37; 375/112; 370/84
[58] Field of Search ............... 375/37, 106, 113, 114, 375/112; 370/82, 84, 100, 102; 371/49, 50

[56] References Cited

U.S. PATENT DOCUMENTS

| | | | |
|---|---|---|---|
| 3,793,636 | 2/1974 | Clark et al. | 375/114 |
| 4,053,715 | 10/1977 | Drapkin | 370/102 |
| 4,220,816 | 9/1980 | Howells et al. | 370/24 |
| 4,249,266 | 2/1981 | Nakamori | 455/608 |
| 4,382,300 | 5/1983 | Gupta | 371/37 |
| 4,417,349 | 11/1983 | Hills et al. | 375/60 |
| 4,419,699 | 12/1983 | Christopher et al. | 375/114 |
| 4,484,327 | 11/1984 | Hanson | 370/84 |
| 4,519,068 | 5/1985 | Krebs et al. | 370/82 |
| 4,555,788 | 11/1985 | Merrill | 370/84 |
| 4,578,818 | 3/1986 | Claydon | 455/110 |
| 4,607,364 | 8/1986 | Neumann | 370/99 |

OTHER PUBLICATIONS

Penney et al., "Survey of Computer Communications Loop Networks Part I", Computer Communication, vol. 2, Aug. 4, 1979.
Copy of facsimile copy of a report dated 4/23/86 (2/9-9/9) re meeting held on 4/10/86.

Primary Examiner—Benedict V. Safourek
Assistant Examiner—Stephen Chin
Attorney, Agent, or Firm—Hamilton, Brook, Smith & Reynolds

[57] ABSTRACT

A digital data service transmission system is described in which 19.2 kbps data rate AMI encoded local loop signals are formatted for reliable transmission at 64 kbps rates over unqualified digital facilities and re-formatted for entry into DDS network hierarchy.

22 Claims, 5 Drawing Sheets

DIGITAL DATA SERVICE SYSTEM

DESCRIPTION

Background Art

Dataphone Digital Service (DDS) is a private line digital data point-to-point, or point-to-multipoint communication service, widely deployed in the United States of America and is described in detail in the following references:
1. "D4 Digital Channel Bank Family", *Bell System Technical Journal*, Vol. 61, Number 9, Part 3, November 1982.
2. "Digital Data System", *Bell System Technical Journal*, Vol. 54, Number 5, May-June 1975.
3. "Generic Requirements for the Subrate Multiplexer", Issue 1, TA-TSY-000189, Bell Communications Research Inc., April 1986. The data rates at which a DDS customer can obtain service are the subrates 2.4 kbps, 4.8 kbps, 9.6 kbps and the full rate, 56 kbps.

Service is deployed using a HUB architecture. As shown in FIG. 1, customer signals using Customer Service Units (CSU) or Data Service Units (DSU) deployed at customer premises 10 and served off end-offices 14 are picked up on 4-wire local loops 12. In the end-office 12, an Office Channel Unit (OCU) 16 interfaces the local loop 12 to a DSX-$\emptyset$ cross-connect frame 18. Even though the loop signal is at one of the subrates, or the full rate, the OCU changes the rate to 64 kbps on the DSX-$\emptyset$ side. The format of the 64 kbps is called the "DS$\emptyset$-A" format and is described in detail in Reference 2 above.

The signal, after passing through the DSX-$\emptyset$ cross connect frame 18, is interfaced to a digital carrier facility 22 by a digital channel bank 20 through a plug-in unit, called a DS$\emptyset$-Dataport 24. In some applications the OCU 16 and the DS$\emptyset$-Dataports 24 are combined together into a plug-in unit called an OCU-Dataport. The digital carrier facility 22 connects the end-office 14 to a HUB office 26 where another DS$\emptyset$-Dataport 28 interfaces the DDS signal from the end office, which is buried in the carrier, to the DSX-$\emptyset$ cross-connect frame 30 in the HUB office 26.

At this cross-connect, the signal is again in the standard DS$\emptyset$-A format. If the service is at subrates, the DS$\emptyset$-A signal is coupled to a Sub-Rate Data Multiplexer (SRDM) 32 where it is multiplexed with other DS$\emptyset$-A subrate signals to form a "DS$\emptyset$-B" signal, still at 64 kbps. This format, for various subrates, is also described in References 1, 2 and 3.

A full-rate (56 kbps) DS$\emptyset$-A signal cannot be further multiplexed at the DS$\emptyset$ (64 kbps) level. The subrate DS$\emptyset$-B signals and the full-rate DS$\emptyset$-A signals are then coupled into second level multiplexers 34 (T1DM, T1BW4, D4 channel banks, etc.) and hauled onto the DDS network 36 of which the HUB 26 is a node.

DDS guarantees 99.5% Error Free Seconds (EFS) and 99.96% availability averaged long term. Inside the network, facilities used are carefully characterized for error performance and are protected with hot standby spares to ensure high availability. As a result, bandwidth inside the network is expensive, which is the reason why subrates are multiplexed into DS$\emptyset$-B signals before entering this network.

The digital carrier facility 22 between the end-office 14 and the HUB 26 is the weak link in the typical communication system thus far described. This facility is shared with other services (e.g., voice trunks) between the end-office and the HUB. These other services do not require the precision of DDS. Typically, these facilities are metro-exchange facilities and are designed for a Bit Error Rate (BER) of $10^{-6}$. The performance can drop to a BER of $10^{-3}$ before maintenance alarms are enabled.

To meet the 99.5% EFS criteria, the facility must run at a BER around $10^{-8}$. Hence, dataports in these facilities have to have Forward Error Correction (FEC) built into them so that after error correction, the effective BER is better than $10^{-8}$, even though the raw BER the facility is running at has dropped to $10^{-3}$. For subrates, the intrinsic redundancy in the DS$\emptyset$-A signal leads to an adequate error correction strategy based on majority voting. For full-rate DS$\emptyset$-A signal, a 64 kbps (DS$\emptyset$) parity channel is formed using a (16,8) shortened version of the well-known (17,9) Golay (BCH) code. The DS$\emptyset$ parity signal is transmitted in another channel along with the full-rate DS$\emptyset$-A signal. The receiver at the far end of the facility 22 detects both the full rate DS$\emptyset$-A signal, as well as the parity-DS$\emptyset$ signal, and corrects enough errors to ensure adequate performance. Details on FEC for both sub-rates and full-rates can be found in Reference 1.

Telephone companies are attempting to induce analog private line customers to change to DDS$\emptyset$ service, which offers better quality data service (99.5% EFS and 99.96% availability). However, these customers use equipment operating at 2.4, 4.8, 9.6 and 19.2 kbps data rates. Standard DDS provides all these rates, except 19.2 kbps.

Accordingly, a need exists for simple and reliable method and apparatus for data transmission over existing communications facilities, as described above, at a data transmission rate of 19.2 kbps. The system should be capable of achieving a residual error rate after correction of $10^{-8}$ and the service should be transparent, as far as the existing central office circuits and error-free maintenance practices are concerned.

DISCLOSURE OF THE INVENTION

The invention comprises a method and apparatus for formatting digital information signals for transmission over existing communication systems at a frequency of 19.2 kbps. Three formats are utilized; one for local loop transmission over four wire loops, a second format for use between data ports incorporates an error correction capability, and a third format for use at the HUB office to allow DSX-$\emptyset$ level entry into the standard DDS network hierarchy.

The local loop format employs Alternate Mark Inversion (AMI) encoding to convert digital data signals generated at the customer premises to an AMI line code format. In AMI, a ONE bit is transmitted as a pulse transition (polarity change) and a ZERO bit as no transition. For 19.2 kbps transmission, the period T of the bit is 1/19200 seconds. The pulse amplitude A is preferably 1.66 V$\pm$6% to minimize excessive crosstalk with other digital services.

The second format, for communication between DS$\emptyset$ dataports, comprises 40 bit words divided into 5 bytes, each byte of 8 bits length. The first byte in a word (DB1) comprises the sequence of a first framing bit F1, followed by 6 data bits (B1-B6) and a first control bit C1. The second byte (DB2) in a word comprises the sequence of a second framing bit F2, followed by 6 more data bits (B7-B12) and a second control bit C2.

The third byte (PB1) in a word comprises a sequence of eight parity bits used for error correction of the DB1 byte. The fourth byte (PB2) contains eight more parity bits of the DB1 byte for error correction of the DB2 byte. The fifth byte is a word framing byte $\overline{PB2}$ comprising the inverse of PB2.

The third format 19.2 kbps signal, for use at the HUB office for communication between a DSQ dataport and a DDS network, also comprises a 40 bit word divided into 5 bytes, each byte of 8 bits length. Byte one (UMC1) comprises the bit sequence of OXXXXXXX ("X" is a don't care bit). Byte UMC1 is taken from a first unassigned MUX channel; bytes two and three comprise DB1 and DB2, respectively, wherein the first bits of each are forced to 1 if in error. Bytes four and five comprise 8 bits each from UMC's 2 and 3. The code sequence for each is OXXXXXXX, as in UMC1. The first bit in each byte in the sequence of bytes 1-5 follow the pattern 01100 which is the correct format for a multiplexed 9.6 kbps DS∅-B signal (See References 1-3).

The three formats described above enable a 19.2 kbps signal to be transmitted over local loops, as well as unqualified loops with level entry into standard DDS network hierarchy, while still enabling error correction capability, transparency and normal maintenance.

The invention will now be described in detail in connection with the drawings.

BEST MODE FOR CARRYING OUT THE INVENTION

I. LOCAL LOOP TRANSMISSION

Figure 2:
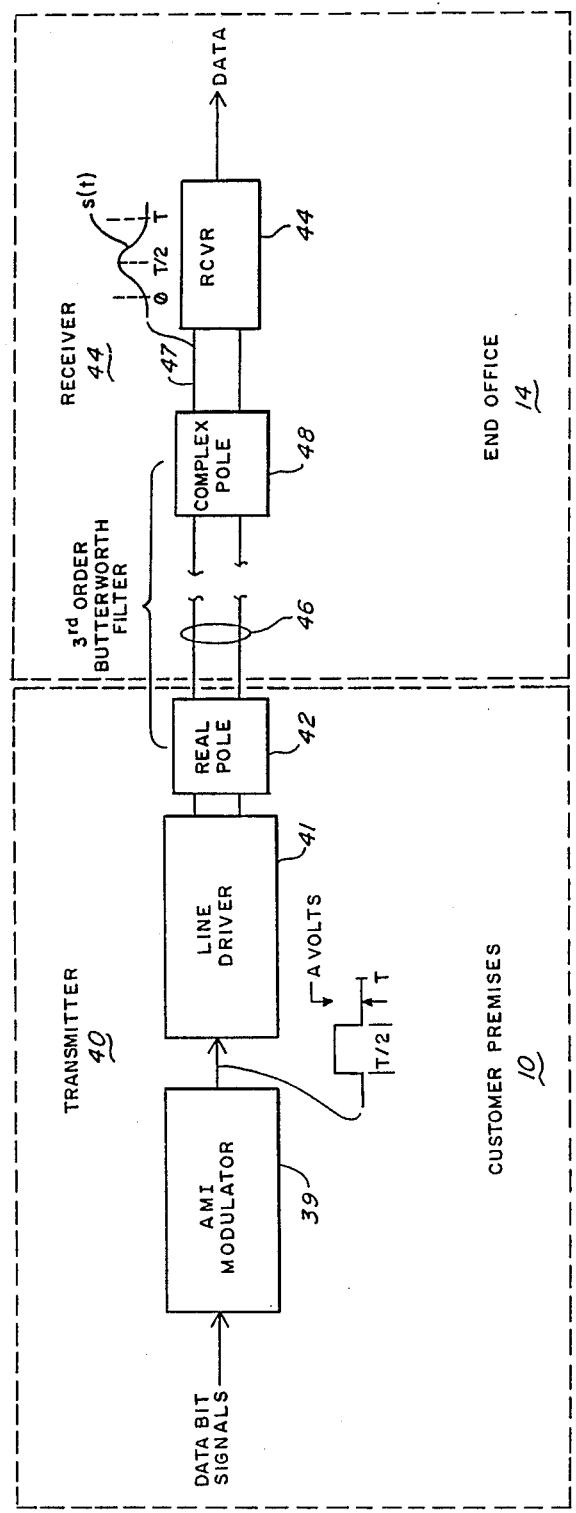
FIG. 2 is a block diagram of transmitter/receiver system employing AMI modulation signalling over four wire loop between, for example, a customer's premises and end-office.

As shown in FIG. 2, customer digital data is encoded at the customer premises 10 in the form of Alternate Mark Inversion (AMI) modulation, using well established techniques (See, e.g., U. S. Pat. No. 4,220,816). The AMI data is transmitted by transmitter 40 at a rate of 19.2 kbps to a receiver 44 at an end-office 14 through a shaping filter, such as a 3rd order Butterworth Filter (See Signals & Systems by A. V. Oppenheim et al., pp 424-425 Prentice-Hall, Inc. 1983). The real pole 42 of the Butterworth Filter is located at transmitter 40 and is coupled across one pair 46 of the four wire loop, while the complex pole 48 is coupled across the pair 46 at the end-office 14 at the input to receiver 44.

As shown in FIG. 2, the amplitude A of the AMI bits transmitted is set at 1.66 volts±6% and the bit period T is 1/19200 seconds. The waveform of the received signal s(t) at the output of the complex pole 48 of the Butterworth Filter is shown on line 47.

It can be shown that at a transmission rate of 19.2 kbps, with A=1.66V±6% and T=1/19200 seconds, the resulting transmission over 2 wire lines will have spectral characteristics that will not cause excessive cross-talk interference with other digital services. Although standard DDS engineering rules require local loops to not exceed 34 db loss at Nyquist frequency (9.6 KHz for 19.2 kbps data rate), it can be shown that with the format described above, adequate margins can be maintained on 1% Near End Cross Talk (NEXT), even when the loop has up to 43 db loss at Nyquist Frequency.

II. ERROR CORRECTION DS∅ FORMAT

Figure 1:
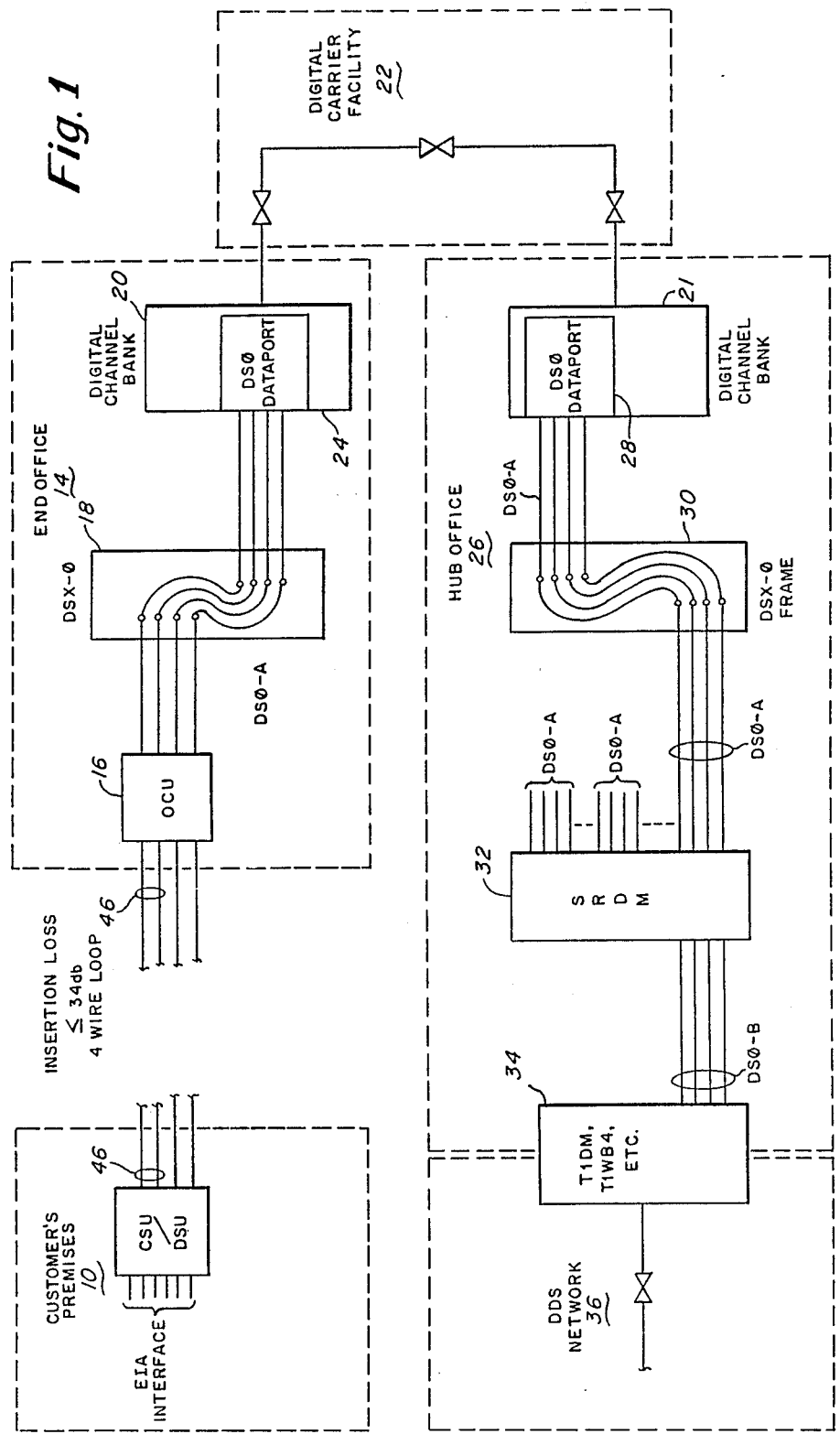
FIG. 1 is a block diagram of the typical architecture of an existing prior art DDS communication network.
Figure 3:
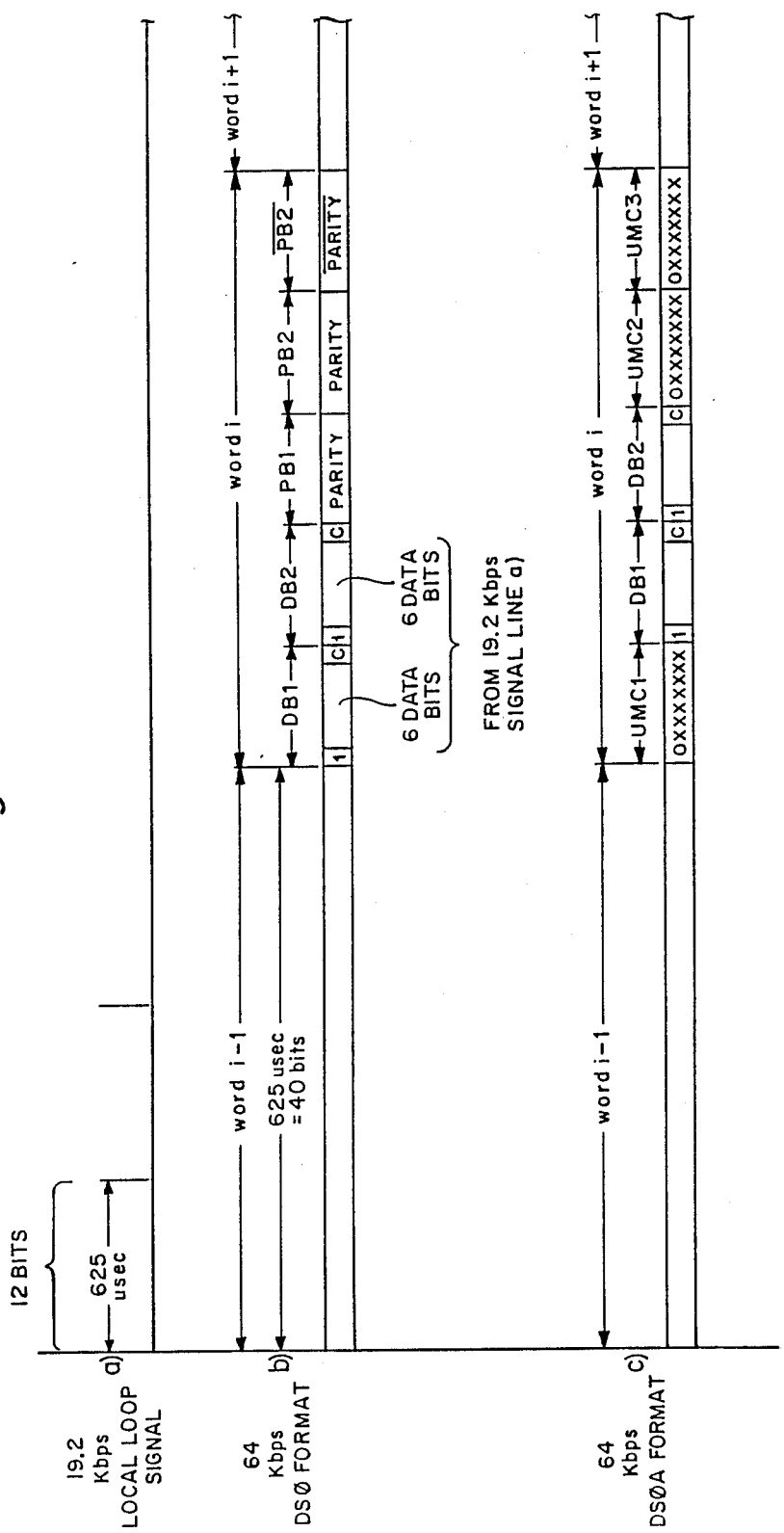
FIG. 3 is a timing diagram showing the time slots allotted in line (a) for local loop signalling at 19.2 kbps, line (b) for DS∅ format and line (c) for DS∅-A format.

The incoming AMI signal at 1.92 kbps at RCVR 44 must now be framed for transmission from the DS∅ dataport 24 of end-office 14 to the DSQ dataport 28 at HUB office 26 via Digital Carrier Facility 22 (See FIG. 1). As noted earlier, the OCU 16 converts the rate of all incoming signals to 64 kbps in what is called a DS∅-A format prior to interfacing with the digital carrier facility 22. The error correction format of the present invention must be made compatible with the DS∅-A format. This is achieved, as shown in FIG. 3, by forming 40 bit words —i−1, i, i+1—, etc. at the receiver 44 (FIG. 2) or DS∅ dataport 24 (FIG. 1). Each 40 bit word is divided into 5 bytes of 8 bits length labelled DB1, DB2, PB1, PB2 and $\overline{PB2}$.

Byte DB1 consists of 6 data bits taken from the 19.2 kbps local loop signal; to which a 1 bit is prefixed and a control bit C is appended. Similarly, byte DB2 consists of the next 6 data bits in the 19.2 kbps local loop signal, to which a 1 bit prefix is added and a control bit C is appended. The control bit functions are described in Reference 2 for prior DDS rates and remain unchanged for 19.2 kbps. Note that a secondary data channel can be safely buried in the "C" channel without creating an undesirable 0000000 byte, because by definition, each byte has a prefix of 1. Next, 8 bit parity bytes PB1 and PB2 are formed, as described in Reference 1 pp. 2750 through pp. 2756, using the (16,8) shortened Golay Code for error correction purposes. PB1 is the parity on DB1 and PB2 is the parity on DB2. A fifth 8 bit byte equal to $\overline{PB2}$ (every PB2 bit inverted) is formed. In this manner, successive 40-bit words are formed, consisting of the five bytes DB1, DB2, PB1, PB2 and $\overline{PB2}$. These words are transmitted from end-office 14 via digital carrier facility 22 at the DS∅ (64 kbps) rate. Comparing line a) of FIG. 3 with line b), it can be seen that 40 bits at 64 kbps, line b), takes 625 us, just as the 12 bits at 19.2 kbps, line a). It can be seen, therefore, that this is a compatible format.

The HUB office receiver at DS∅ dataport 28 frames the 40-bit word transmitted over the digital carrier facility by demodulating the signal and comparing incoming 8 bit bytes and detecting inverted adjacent bytes. This comparison must be "flywheeled", i.e., an N out of M type test (See Reference 1) must be done before declaring framing to ensure high framing reliability, even in the presence of BER around $10^{-8}$. It can be demonstrated for reasonable numbers like N=16, M=20 word framing error events will be separated by several years.

Having framed the word, the receiver corrects errors on DB1; using PB1; and on DB2; using PB2, as described in Reference 1, pp. 2750 through pp. 2756. It then converts the error corrected DB1 and DB2 into the DS∅-A format, as described in the next section. This DSØ-A signal is then coupled to the DSX-Ø cross-connect frame 30 for routing, as discussed earlier.

III. 19.2 kbps DSØ FORMAT

FIG. 3, line C, shows the DSØ format for 19.2 kbps at the HUB office 26. Again, a 40 bit word is formed using 5 bytes. The first byte has bit 1, the first bit transmitted, set to a "0" the error correcting logic and maintenance circuits of the system are insensitive to the state of the next 7 bits in the byte, which are labelled "X" (don't cares). This takes up a time interval of 125 usec. The DB1 and DB2 bytes occupy the next two 125 usec. time intervals. The first bit of DB1 and DB2 are error corrected by error correction, if needed. Two more bytes, similar to the byte in the first 125 μsec. time interval, are appended to form the 40 bit word. The rate is readily shown to be 64 kbps. The entire 5 byte word takes up a 625 μsec. time interval. It can be seen in FIG. 3 line C, that the pattern formed by bit 1 of each byte is 01100, which is the correct format for a multiplexed 9.6 kbps DSØ-B signal (References 2,3). This 19.2 kbps DSØ signal of FIG. 3, line C, can be viewed as a partially filled DSØ-B subrate signal, In order to be compatible with other current DDS maintenance procedures, it is advantageous to repeat bit 2 through 8 of DB2 in the "X" (don't care bits 2 through 8) of the unused bytes 1, 4 and 5. This is because some maintenance systems send specific multiples of bytes which they expect will be seen by the unit which is to be tested. A detailed definition of these maintenance procedures is provided in Reference 4 ("Digital Channel Banks - Requirements for Dataport Channel Unit Functions", Issue 3, TA-TSY 000077, Bell Communications Research Inc., April 1986).

It should be noted that the 01100 frame pattern in bit 1 of the 5 bytes that make up the 19.2 kb/s word must be maintained. Also, since in the 19.2 kbps DSO format, the first bit of DB1 and DB2 is a "1", the control channel "C", discussed earlier, can be bit robbed to create a secondary channel. If, in every third data byte (DB1, DB2), the "C" bit is robbed, the rate of this secondary channel will be 16/15=1.06 kbps, where 6 means 6 recurring. In summary, use of the above-described signal formats enable a 19.2 kbps data rate signal to be added to DDS. These formats enable transmission at 19.2 kbps over local loops, as well as error correction over unqualified (with respect to BER) digital facilities. In addition, the 19.2 kbps DSØ format, as defined, allows these signal DSX-Ø level entry into the standard DDS network hierarchy. The signals discussed can be readily maintained using existing DDS maintenance tools. Finally, secondary channel capability of up to 16/15 kbps has also been described.

IV. ENCODING

Figure 4:
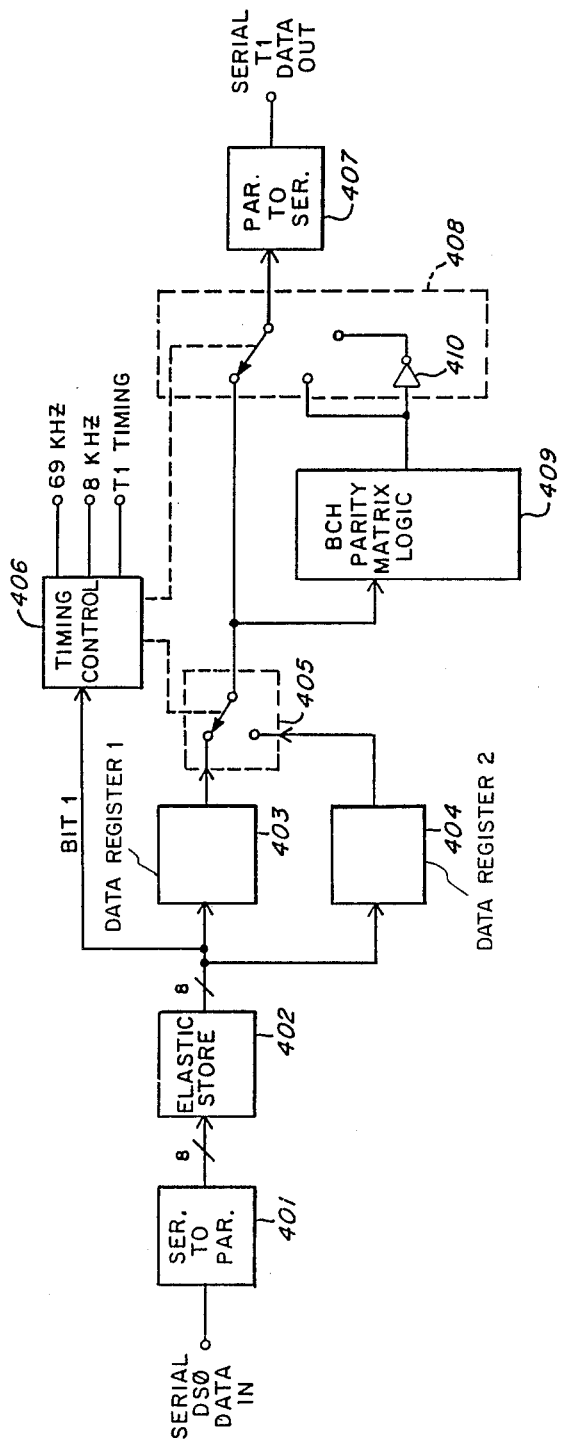
FIG. 4 is a block diagram of the error correction encoding system of the invention for 19.2 kbps signalling.

FIG. 4 shows an implementation of 19.2 kbps encoding to allow later error correction. Serial Data of 64 kbps enters a serial to parallel converter 401 and is converted to 8-bit parallel data (indicated throughout by an 8/ at the line). An elastic store 402 removes any timing phase differences between the input data clock and the output data clock (not shown). The two data bytes are identified by a one in bit 1, and are stored in data registers (D.R.) 403 and 404, respectively. Multiplexer switch 405 selects data byte 1 from register 403 under control of timing logic control 406. Parallel to serial converter 407 then converts data byte 1 to serial and sends it out. Then, multiplexer 405 selects data register #2 (404), which is sent out. Next, multiplexer 405 selects data register 403. This data passes through BCH parity matrix logic circuit 409 (See Reference 5, "Error Correcting Codes", W. W. Peterson and E. J. Weldon, Jr., M.I.T. Press, 1972). Multiplexer switch 408 selects the parity matrix 409 output, sending data byte 1 parity to the parallel to serial converter 407. Multiplexer 405 then switches to data register #2 (404), which goes through the parity matrix 409 and the parallel to serial converter 407. Multiplexer 408 then selects the inverted parity from inverters 410 to send out the inverted parity of data byte 2.

V. DECODING

Figure 5:
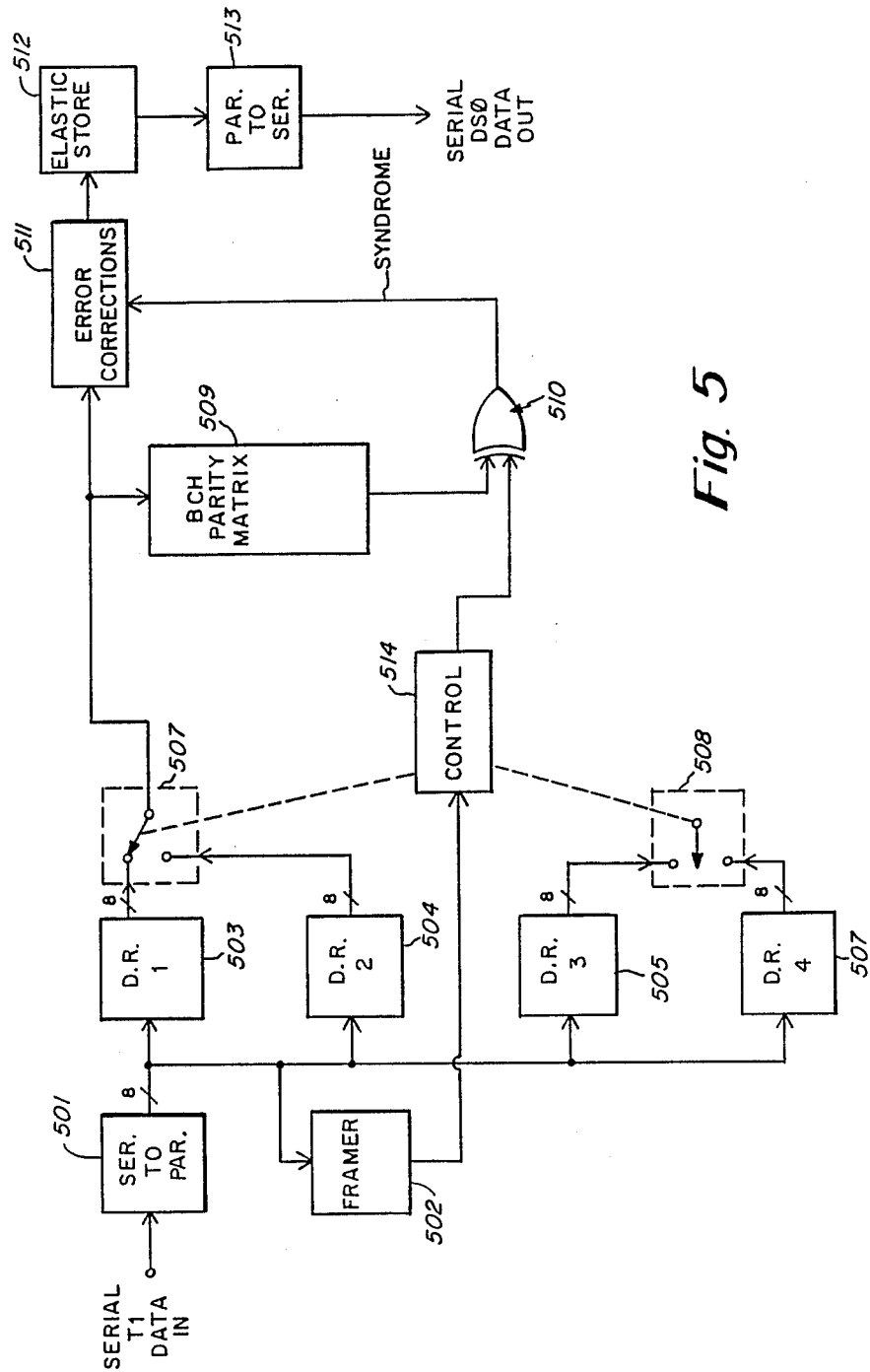
FIG. 5 is a block diagram of the error correction decoding system of the invention for 19.2 kbps signalling.

FIG. 5 shows the 19.2 kbps error correcting decoding. Serial to parallel converter 501 accepts the 5 bytes frame DB1, DB2, PB1, PB2 and $\overline{PB2}$. Framer 502 detects the fact that $\overline{PB2}$ is the inverse of PB2 and in this manner identifies the frame boundaries. Data bytes DB1 and DB2 are stored in registers 503 and 504, respectively.

Parity bytes PB1 and PB2 are stored in registers 505 and 506, respectively. First, multiplexer switch 507, under the control of control logic 514, selects data register #1 (503), while multiplexer switch 508 selects parity register #1 (505). The data is encoded using the identical parity matrix 509, as was used in the encoder 409 of FIG. 4. The result is modulo-2 added (XOR-ED) to the received parity PB1 from multiplexer 508 by XOR-GATES 510. This output is referred to as the syndrome (See U. S. Pat. No. 4,382,300 to D. Gupta, issued May 3, 1983). If no errors occurred, the syndrome will be zero. If a correctable number of errors occurred, the syndrome will indicate which specific bit or bits should be inverted to correct them. This conversion is done by Error Correction logic 511. Next, multiplexer switches 507 and 508 select DB2 and PB2, respectively. In an identical manner as DB1 and PB1, errors are corrected. Elastic store 512 removes any jitter between input and output clocks. Parallel to serial converter 513 converts the 8-bit parallel data to a serial output bit stream.

Equivalents

While the invention has been described in connection with specific methods and apparatus, it is to be understood that the description is by way of example and not as a limitation to the scope of the invention as set forth in the following claims. For example, while specific reference has been made to the Dataphone Digital System of AT&T, in the introduction, the invention has applicability to digital data services, in general, wherein reliable 19.2 kbps signal transmission is required.

I claim:

1. A method for formatting a series of data bits originally generated at a rate of 19.2 kbps for re-transmission at a rate of 64 kbps comprising the steps of:
   (a) formatting said series of data bits into words of forty bit length; each word being divided into five bytes of 8 bits length; and wherein
      (i) the first byte in a word comprises the sequence of a first framing bit, followed by six bits of said bit signals, followed by a first control bit;
      (ii) the second byte in a word comprises the sequence of a second framing bit, followed by six more bits of said bit signals, followed by a second control bit;

(iii) the third byte in a word comprises a first set of 8 parity bits;
(iv) the fourth byte in a word comprises a second set of 8 parity bits; and
(v) the fifth byte in a word comprises a framing byte of 8 bits length;
(b) transmitting said words at a bit rate of 64 kbps such that the time duration of 12 of the original bits is the same duration for 40 of the reformatted bits when transmitted at 64 kbps.

2. The method of claim 1 further including the steps of:
(c) receiving said words and formatting the first and second bytes of each word into a second forty bit word of five bytes wherein the first byte comprises an 8 bit sequence of bits, the first bit of which is a ZERO, the second and third bytes comprise the first and second bytes of the received word and the fourth and fifth bytes each comprise 8 bit sequences of bits, the first bit of which is a ZERO.

3. The method of claim 2 wherein the first and second framing bits are ONEs, such that the first bit in each word byte of each second forty bit word follows the sequence 01100.

4. The method of claim 1 wherein the amplitude A of the bit signals is 1.66 v plus or minus 6%.

5. The method of claim 1 wherein the first and second framing bits are ONEs and the framing byte is the inverse of the fourth byte.

6. Apparatus for formatting a series of data bits generated at a rate of 19.2 kbps for transmission at a rate of 64 kbps comprising:
(a) encoding means for encoding said data bits in the form of alternate mark inversion bit signals of pulse amplitude A and period T; wherein T=1/19200 seconds for generation at a rate of 19.2 kbps through a 3rd order Butterworth filter over a pair of wires;
(b) formatting said bit signals into first words of forty bit length; each word being divided into five bytes of 8 bits length; and wherein
(i) the first byte in a word comprises the sequence of a first framing bit, followed by six bits of said bit signals, followed by a first control bit;
(ii) the second byte in a word comprises the sequence of a second framing bit, followed by six more bits of said bit signals, followed by a second control bit;
(iii) the third byte in a word comprises a first set of 8 parity bits;
(iv) the fourth byte in a word comprises a second set of 8 parity bits; and
(v) the fifth byte in a word comprises a framing byte of 8 bits length; and
(c) means for transmitting said words at a bit rate of 64 kbps.

7. The apparatus of claim 6 further including:
d) means for receiving said words and formatting the received words into a second forty bit word of five bytes wherein the first byte comprises an 8 bit sequence of bits, the first bit of which is a ZERO, the second and third bytes comprise the first and second bytes of the received word and the fourth and fifth bytes each of which comprise an 8 bit sequence of bits, the first bit of which is a ZERO.

8. The apparatus of claim 7 wherein the first and second framing bits are ONEs, such that the first bit in each word byte of each second forty bit word follows the sequence 01100.

9. The apparatus of claim 7 wherein A=1.66 v±6%.

10. The apparatus of claim 6 further including encoder means for encoding each first words of forty bit length to permit later error correction.

11. The apparatus of claim 10 wherein the encoder means comprises:
(i) means for detecting the first and second bytes in a word by the framing bytes; and
(ii) means for successively multiplying the third and fourth bytes with the first and second bytes in a parity matrix logic circuit.

12. The apparatus of claim 11 further comprising means for decoding said encoded words.

13. A method for formatting a series of data bits originally generated at a lower rate for transmission at a higher rate comprising the steps of:
(a) formatting said bit signals generated at said lower rate for transmission at said higher rate into words of forty bit length; each word being divided into five bytes of 8 bits length; and wherein
(i) one byte in a word comprises the sequence of a first framing bit, followed by six bits of said bit signals, followed by a first control bit;
(ii) another byte in a word comprises the sequence of a second framing bit, followed by six more bits of said bit signals, followed by a second control bit;
(iii) another byte in a word comprises a first set of 8 parity bits;
(iv) another byte in a word comprises a second set of 8 parity bits; and
(v) the remaining byte in a word comprises a byte of 8 bits length;
(b) transmitting said words at said higher rate such that 12 bits from the lower rate generated signal are generated during the same time duration it takes to transmit one 40 bit word at the higher rate.

14. The method of claim 13 wherein the remaining byte is a framing byte.

15. The method of claim 14 wherein the remaining byte is the inverse of one of said 8 parity bits.

16. The method of claim 13 wherein the bytes in (i) and (ii) are adjacent each other in time sequence followed by the bytes in (iii), (iv) and (v) in time sequence.

17. Apparatus for formatting data bits generated at a lower rate of F for transmission at a higher rate of 3.33F such that x number of data bits at the higher rate occur in the same time frame that y number of bits are transmitted at the higher rate:
(a) means for formatting x number of bit signals into first words of y bit length; each word being divided into five bytes of x/2+2 bits length; and wherein
(i) one byte in a word comprises a first data byte having the sequence of a first framing bit, followed by x/2 bits of said bit signals, followed by a first control bit;
(ii) another byte in a word comprises a second data byte having the sequence of a second framing bit, followed by x/2 more bits or said bit signals, followed by a second control bit;
(iii) another byte in a word comprises a first parity byte of a set of x/2+2 parity bits;
(iv) another byte in a word comprises a second parity byte of a set of x/2+2 parity bits; and
(v) the remaining byte in a word comprises a byte of x/2+2 bits length; and (c) means for transmitting said words at a bit rate of y kbps.

18. A method of formatting bit signals transmitted at a lower rate of F for transmission at a higher rate of 3.33 F comprising the steps of:
(a) forming said bit signals into words of y bit length;
(b) dividing each word into five bytes of x/2+2 bits length; in which
   (i) the first byte in a word comprises the sequence of a first framing bit, followed by x/2 bits of said bit signals, followed by a first control bit;
   (ii) the second byte in a word comprises the sequence of a second framing bit, followed by x/2 more bits of said bit signals, followed by a second control bit;
   (iii) the third byte in a word comprises a first set of x/2+2 parity bits;
   (iv) the fourth byte in a word comprises a second set of x/2+2 parity bits; and
   (v) the fifth byte in a word comprises a framing byte of x/2+2 bits length.

19. A method of formatting bit signals comprising the steps of:
(a) forming said bit signals into words of forty bit length;
(b) dividing said words into five bytes of 8 bits length; in which
   (i) one byte in a word comprises the sequence of a first framing bit, followed by six bits of said bit signals, followed by a first control bit;
   (ii) another byte in a word comprises the sequence of a second framing bit, followed by six more bits of said bit signals, followed by a second control bit;
   (iii) another byte in a word comprises a first set of 8 parity bits;
   (iv) another byte in a word comprises a second set of 8 parity bits; and
   (v) the remaining byte in a word comprises a byte of 8 bits length.

20. Apparatus for formatting bit signals transmitted at a low rate into bit signals for re-transmission at a higher rate comprising:
(a) means for forming said bit signals into first words of forty bit length;
(b) means for dividing said words into five bytes of 8 bits length; in which
   (i) one byte in a word comprises a first data byte having the sequence of a first framing bit, followed by six bits of said bit signals, followed by a first control bit;
   (ii) another byte in a word comprises a second data byte having the sequence of a second framing bit, followed by six more bits of said bit signals, followed by a second control bit;
   (iii) another byte in a word comprises a first parity byte of a set of 8 parity bits;
   (iv) another byte in a word comprises a second parity byte of a set of 8 parity bits; and
   (v) the remaining byte in a word comprises a byte of 8 bits length.

21. The method of claim 17 wherein x=12 and y=40 and F=19.2 kbps.

22. The method of claim 18 wherein x=12 and y=40 and F=19.2 kbps.

* * * * *

UNITED STATES PATENT AND TRADEMARK OFFICE
CERTIFICATE OF CORRECTION

PATENT NO. : 4,862,480
DATED : August 29, 1989
INVENTOR(S) : Dev V. Gupta

It is certified that error appears in the above—identified patent and that said Letters Patent is hereby corrected as shown below:

Col. 6, line 56, delete "bits" and insert ---bit signals---.
Col. 7, line 31, delete "bits" and insert ---bit signals---.
Col. 8, line 16, delete "bits" and insert ---bit signals---.
Col. 8, line 47, delete "bits" and insert ---bit signals---.
Col. 9, line 2, delete "y" and insert ---3.33F---.

Signed and Sealed this

Twenty-first Day of August, 1990

Attest:

HARRY F. MANBECK, JR.

Attesting Officer

Commissioner of Patents and Trademarks